(12) United States Patent  
Bader

(10) Patent No.: US 7,387,588 B2
(45) Date of Patent: Jun. 17, 2008

(54) PLANETARY GEAR TRAIN

(75) Inventor: Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 200 days.

(21) Appl. No.: 10/557,945

(22) PCT Filed: May 18, 2004

(86) PCT No.: PCT/EP2004/005329

§ 371 (c)(1),
(2), (4) Date: Nov. 21, 2005

(87) PCT Pub. No.: WO2004/104445

PCT Pub. Date: Dec. 2, 2004

(65) Prior Publication Data
US 2007/0042859 A1  Feb. 22, 2007

(30) Foreign Application Priority Data
May 23, 2003 (DE) .................... 103 23 254

(51) Int. Cl.
F16H 3/44 (2006.01)
F16H 57/08 (2006.01)

(52) U.S. Cl. .............. 475/303; 475/331; 475/348
(58) Field of Classification Search ............... 475/207, 475/218, 302, 303, 331, 343, 348
See application file for complete search history.

(56) References Cited
U.S. PATENT DOCUMENTS 3,080,775 A * 3/1963 Fritsch ................ 475/346
3,178,967 A    4/1965 Fritsch
3,654,822 A * 4/1972 Singer et al. ............ 475/218
4,159,657 A    7/1979 Stilley
4,384,498 A * 5/1983 Eichinger ............... 475/345
4,674,360 A    6/1987 Matoba
4,802,375 A    2/1989 Stodt
5,302,160 A    4/1994 Fujioka (Continued)

FOREIGN PATENT DOCUMENTS
DE    29 08 678    9/1979

(Continued)

OTHER PUBLICATIONS
English translation of DE 4121709, translated on Sep. 13, 2007 via epo online.*

Primary Examiner—Roger Pang
(74) Attorney, Agent, or Firm—Davis Bujold & Daniels, P.L.L.C.

(57) ABSTRACT

Disclosed is a planetary gear train (8) comprising an internal gear (24), a sun gear (52), a planet carrier (10) which is provided with planet shafts (18) and on which at least one planetary gear (20) is mounted, and a shifting device with a sliding sleeve (66). Said shifting device allows for a direct connection between a shaft (44) driving the planetary gear train (8) and an output shaft (12) of the planetary gear train (8) in one shifting position while making it possible to modify the rotational speed between the driving shaft (44) and the output shaft (12) of the planetary gear train (8) in another shifting position. The planet shaft (18) is disposed inside the planet carrier (10) so as to be rotatable within a bearing (22, 80).

12 Claims, 3 Drawing Sheets

U.S. PATENT DOCUMENTS

| | | | |
|---|---|---|---|
| 5,390,559 A * | 2/1995 | Thomas et al. | 74/325 |
| 5,558,593 A | 9/1996 | Röder et al. | |
| 6,196,944 B1 | 3/2001 | Schmitz | |
| 6,530,859 B2 * | 3/2003 | Boston et al. | 475/331 |
| 6,659,902 B1 * | 12/2003 | Ehrlinger | 475/269 |
| 6,719,658 B2 | 4/2004 | Haga et al. | |
| 6,770,007 B2 * | 8/2004 | Fox | 475/348 |

FOREIGN PATENT DOCUMENTS

| | | |
|---|---|---|
| DE | 35 43 269 A1 | 6/1987 |
| DE | 40 09 968 A1 | 11/1990 |
| DE | 41 21 709 A1 | 1/1992 |
| DE | 44 11 604 A1 | 10/1995 |
| DE | 198 51 895 A1 | 5/2000 |
| DE | 101 63 383 A1 | 7/2002 |
| EP | 0 454 198 A1 | 10/1991 |

* cited by examiner

PLANETARY GEAR TRAIN

This application is a national stage completion of PCT/EP2004/005329 filed May 18, 2004 which claims priority from German Application Serial No. 103 23 254.0 filed May 23, 2003.

FIELD OF THE INVENTION

The invention concerns a planetary gear.

BACKGROUND OF THE INVENTION

Commercial vehicles with a large number of gear ratios frequently exhibit a speed range gear which is connected to the principal gear with its gear ratios. By means of a speed range gear, the overall multiplication factor of the principal gear can be increased, because all of the gear ratios of the principal gear can be used together with each gear ratio of the speed range gear, and in at least one gear ratio of the speed range gear, the multiplication factor of the gear ratios of the principal gear can be reduced and/or increased.

A speed range gear for automobiles has been disclosed, by way of example, in DE 41 21 709 A1. A planetary gear of this type, installed downstream of the principal gear, provides the possibility of operating the automobile in two different speed ranges for each of the gear ratios of its principal gear. In a first slowed-down gear ratio level of the speed range gear, the annulus of the planetary gear is coupled to the gearbox by means of a switching clutch, so that the output shaft of the speed range gear exhibits a lower revolution speed than the output shaft of the principal gear. In a second gear ratio level, direct transmission takes place from the output shaft of the principal gear to the output shaft of the speed range gear, whereby the direct connection between the output shaft of the principal gear and the output shaft of the speed range [gear] is created by means of a switching clutch. The switching device is extremely complex.

DE 198 51 895 A1 describes an additional speed range gear in the form of a planetary gear. In that publication, the annulus of the planetary gear is connected in a torque-proof manner to the gearbox. The sun gear of the planetary gear is arranged coaxially to the output shaft of the main gear and is freely rotatable relative to the output shaft of the principal gear. In order to create a reduction ratio between the output shaft of the principal gear at the output shaft of the speed range gear, the sun gear can be connected in a torque-proof manner to the output shaft of the principal gear. This planetary gear is also complex and problematic for the mounting of individual components.

The invention is based on the task of improving a planetary gear and especially the component mounting.

SUMMARY OF THE INVENTION

A planetary gear which includes an annulus, a sun gear and a planet gear carrier with planet wheel axle, on which at least one planet wheel is mounted, exhibits a switching device with a sliding collar, which, in one switching position, enables a direct connection between the shaft, which drives the planetary gear and an output shaft of the planetary gear and, in another switching position, enables modification of the revolution speed between the driving shaft and the output shaft of the planetary gear. To improve the mounting and reduce friction losses, the planet wheel axle is arranged rotatably in a bearing assembly in the planet gear carrier.

In an especially advantageous embodiment, the planet wheel is arranged rotatably in a bearing assembly on the rotatable planet wheel axle.

Preferably, the mounting of the planet wheel axle in the planet gear carrier represents a different type of bearing assembly than the mounting of the planet wheel on the planet wheel axle. In this regard, in a preferred embodiment, the planet wheel axle is mounted in the planet gear carrier by means of a friction bearing assembly, and the planet wheel is mounted on the planet wheel axle by means of a roller bearing assembly. In another, also preferred embodiment, the planet wheel axle is mounted in the planet gear carrier by means of a roller bearing assembly, and the planet wheel is mounted on the planet wheel axle by means of a friction bearing assembly. In this context, the planet wheel axle may exhibit oil supply devices which are connected to a gear oil supply.

It is advantageous to have a device which is exhibited by the planet gear carrier and which prevents axial displacement of the planet wheel axle in the planet gear carrier.

In a specific embodiment, the switching device exhibits a neutral position which lies between the two switching positions and in which the output shaft of the planetary gear is not driven.

Both the annulus and the sun gear may exhibit pressure pads which rest against the planet wheel. Preferably, the roller bearing assembly includes a multiple row bearing.

The form of the invention is considered particularly advantageous when the planetary gear represents a speed range gear of a vehicle transmission, formed in such a way as to be connected, by means of a torque-transferring drive train, to a principal gear, so that the output shaft of the principal gear forms the drive shaft of the planetary gear.

The invention may be used in an equally advantageous manner with a principal gear which includes two secondary shafts and a principal shaft mounted in a floating manner between the secondary shafts, so that the principal shaft serves as the output shaft of the principal gear and forms the drive shaft of the planetary gear, and the end of the principal shaft is mounted in the sun wheel of the planetary gear.

BRIEF DESCRIPTION OF THE DRAWINGS

The invention will now be described, by way of example, with reference to the accompanying drawings in which.

DETAILED DESCRIPTION OF THE INVENTION

Figure 1:
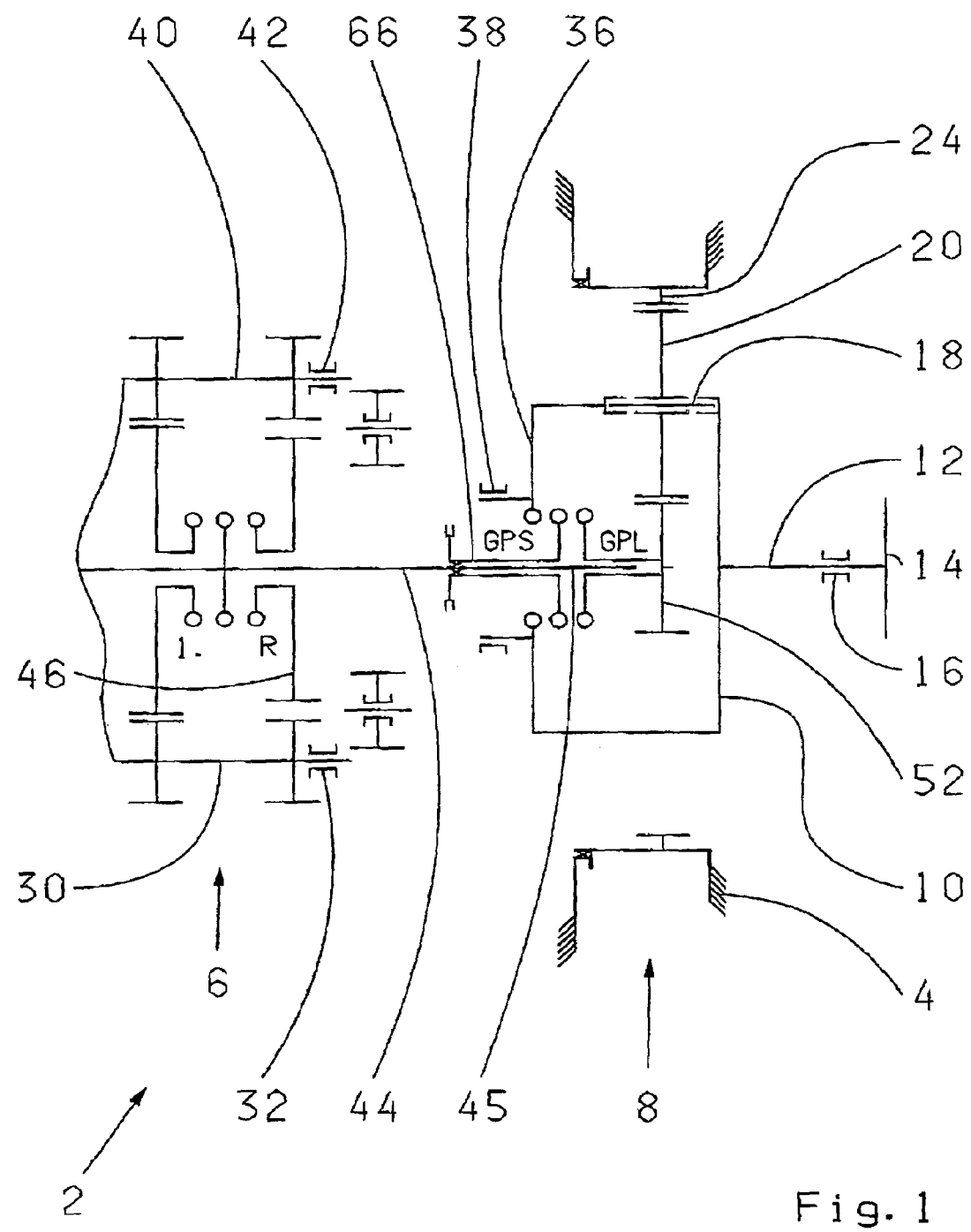
FIG. 1 is a schematic arrangement of the planetary gear.

A manual transmission 2 for a vehicle exhibits, within a gearbox 4, a principal gear 6 and a speed range gear in the form of a planetary gear 8, connected to the principal gear 6. The planetary gear 8 includes a planet gear carrier 10, which is implemented as a common component with an output shaft 12 of the manual transmission 2. An output flange 14 is fastened to the output shaft 12, and the output shaft 12 is mounted in a bearing assembly 16 in the gearbox 4. The planet gear carrier 10 exhibits a plurality of planet wheel axles 18, distributed around the circumference thereof, whereby one of said planet wheel axles 18 is shown. A planet wheel 20 is mounted on the planet wheel axle 18 in a roller bearing assembly 22. Typically, three or five planet wheels 20 are distributed around the circumference of the planet gear carrier 10. The roller bearing assembly 22 consists of a two-row cylinder roller bearing or needle bearing. The planet wheel 20 is surrounded on the outside by an annulus 24, which exhibits a tooth system 26, which can engage with a tooth system 28 on the gearbox 4.

The planet gear carrier 10, on the side of the planetary gear 8 lying opposite the output shaft 12, exhibits an extension 36, on which the planet gear carrier 10 is mounted in the gearbox 4 by means of a roller bearing 38. A secondary shaft 30 of the principal gear 6 is mounted by means of a bearing assembly 32, and another secondary shaft 40 of the principal gear 6 is mounted by means of a bearing assembly 42, in the gearbox 4. A principal shaft 44 of the principal gear 6, at the end thereof, bears a gear wheel 46 of the reverse gear ratio. The gear wheel 46 is located on the principal shaft 44 with a small degree of radial play, which is typical of a manual transmission with a power split on two secondary shafts. Provided at the end of the principal shaft 44 according to FIG. 1 is a pivot 45, which can also be formed with a slit profile. A sun wheel 52 is arranged on the pivot 45 of the principal shaft 44, whereby, according to FIG. 1, the principal shaft 44 is supported in the sun wheel 52. Arranged between the sun wheel 52 and the output shaft 12 and/or the planet gear carrier 10 is a sleeve 50, which conducts the oil between the shafts. Also provided for oil conduction is a sleeve 54 between the principal shaft 44 and the sun wheel 52.

Arranged on the sun wheel 52 are two pressure pads 56 and 58, which prevent an axial movement of the planet wheel 20 relative to the sun wheel 52, but allow the planet wheel 20 to rest on the pressure pads in order to take up an axially directed force which results from the oblique toothing of the planetary gear 8. Two additional pressure pads 60 and 62 are arranged radially inside the annulus 24 and similarly allow the planet wheel 20 to rest against them. The two pressure pads 60 and 62 prevent an axial movement of the planet wheel 20 relative to the annulus 24.

Figure 2:
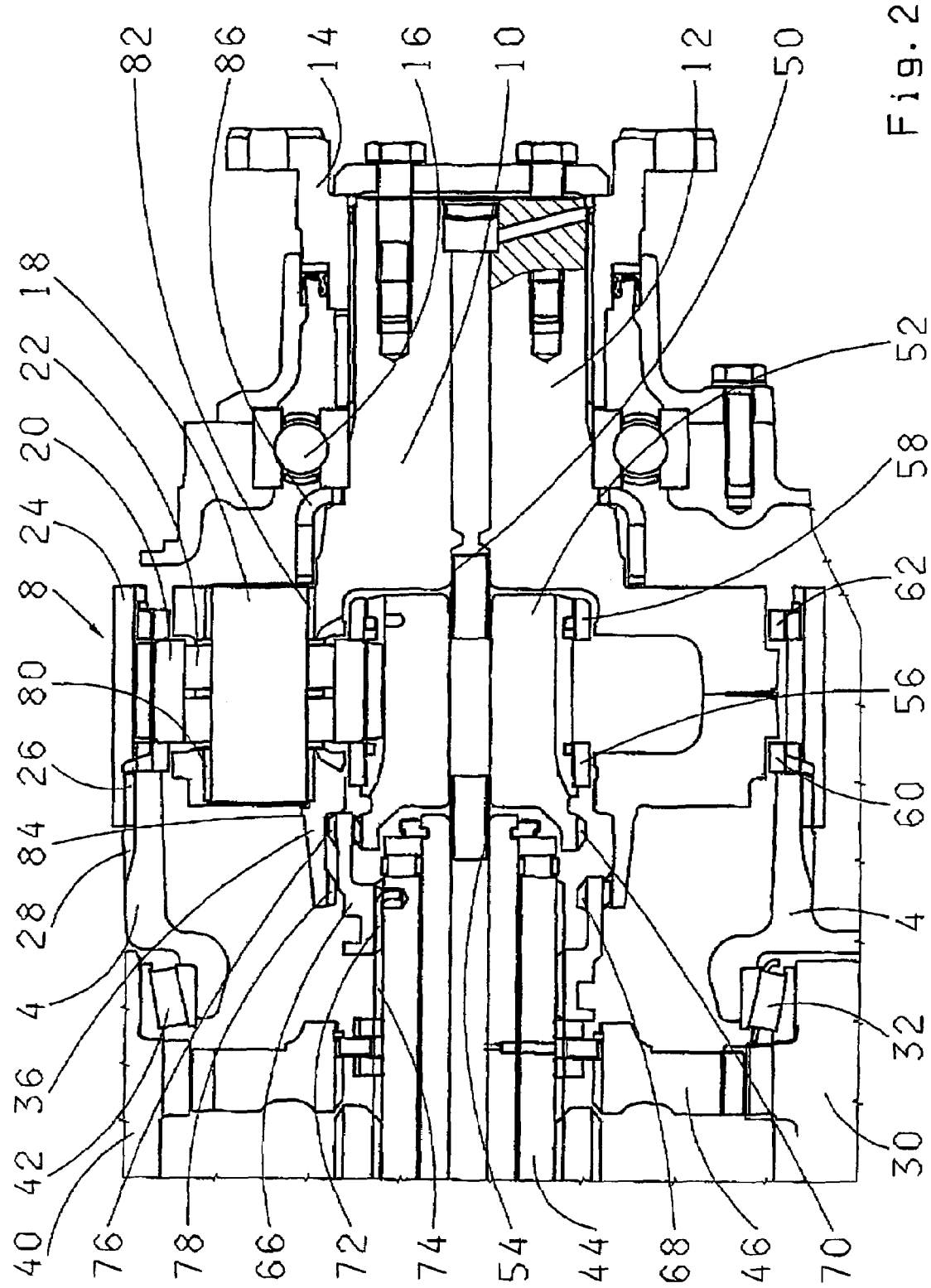
FIG. 2 is the planetary gear with a first switching device.

A sliding collar 66 exhibits a first internal tooth system as a switching tooth system 68, which engages with a switching tooth system 70 on the sun wheel 52 and forms a torque-proof connection between the sliding collar 66 and the sun wheel 52 (FIG. 2). In order to form a torque-proof connection between the sliding collar 66 and the principal shaft 44, the sliding collar 66 exhibits a second internal tooth system 72, which engages with an external tooth system 74 on the principal shaft 44.

In order to create an optionally torque-proof connection between the principal shaft 44 and the planet gear carrier 10, so as to form a direct connection between the principal gear 6 and the output shaft 12 without changing the revolution speed, the sliding collar 66 exhibits a switching tooth system 76, which can engage with a switching tooth system 78 on the extension 36 of the planet gear carrier 10.

Figure 3:
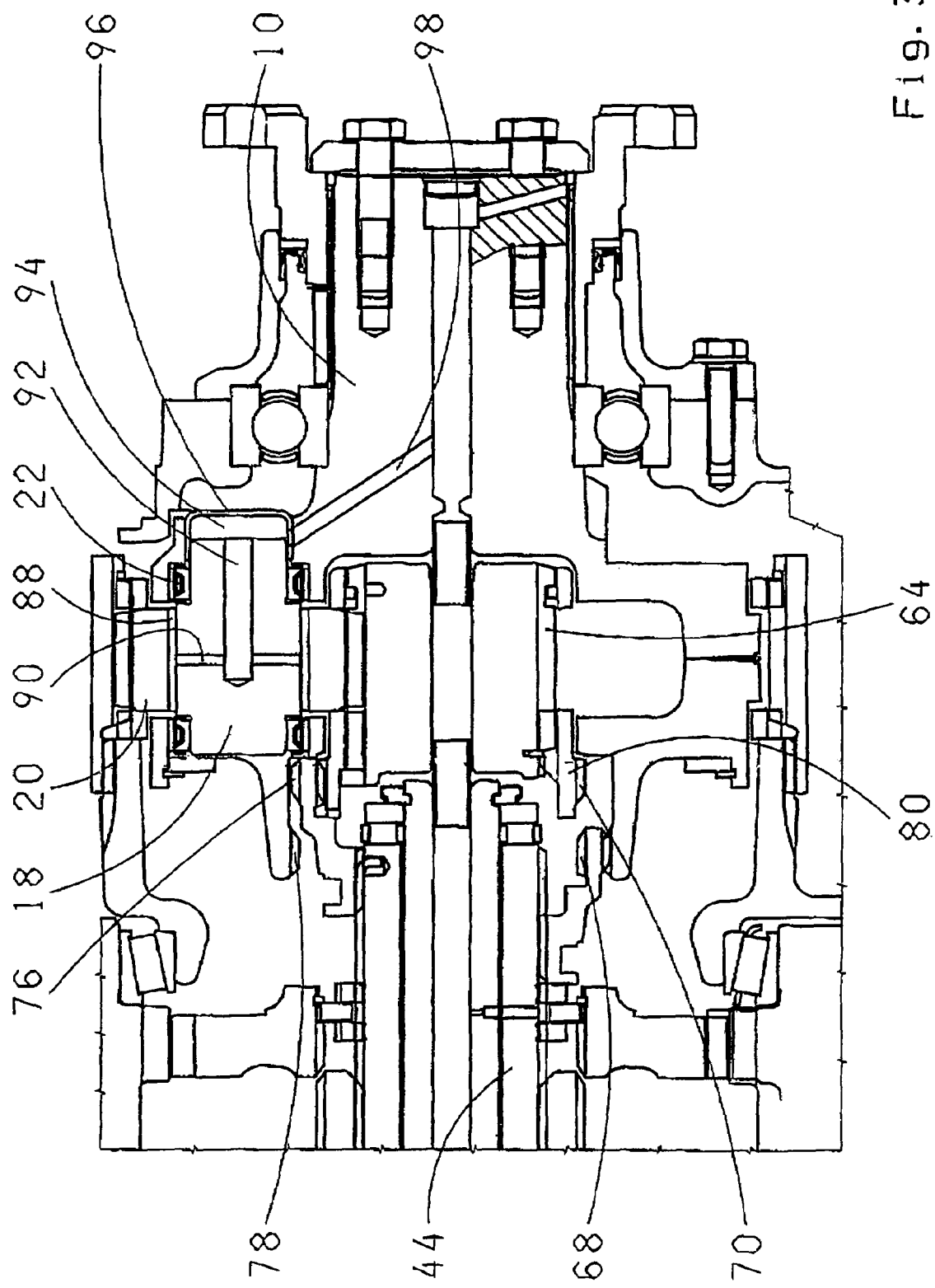
FIG. 3 is the planetary gear with a second switching device.

The top half of the planetary gear 8 in both FIG. 2 and FIG. 3 shows the switching position of the sliding collar 66, which enables a torque-proof connection, by means of the switching tooth systems 68 and 70, between the principal shaft 44 and the sun wheel 52. The respective bottom half of each Figure represents the switching position of the sliding collar 66, which shows a direct connection, by means of the switching tooth systems 76 and 78, between the principal shaft 44 and the planet gear carrier 10. In this switching position, the planetary gear 8 runs load-free, because the entire torque is transferred via the planet gear carrier 10.

Between the two switching positions shown in each Figure, a neutral position is possible.

In FIG. 2, the planet wheel 20 is mounted on the planet wheel axle 18 in the roller bearing assembly 22. Instead of a plurality of cylinder roller bearings as the roller bearing assembly 22, it is also possible to consider a multiple row bearing, for example, a two-row needle bearing. The planet wheel axle 18 is rotatably mounted in the planet gear carrier 10 in a first friction bearing assembly 80 and a second friction bearing assembly 82. By means of the friction bearing assembly 80, 82, the planet wheel axle also becomes potentially axially displaceable, so that it must be axially immobilized. This is accomplished, on one hand, by means of a rim 84 on the extension 36 and, on the other hand, by means of a cup-shaped ring 86, which is here clamped between the planet wheel axle 18 and the bearing assembly 16 in the gearbox 4.

In the switching position of the sliding collar 66, in which the switching tooth systems 68 and 70 engage with each other, the planetary gear 8 is subject to a high load. Through the use of two different kinds of bearing assemblies, according to the invention, this load can be reduced. The planet wheel 20, which is driven by the sun wheel 52, creates only a small amount of friction in the roller bearing assembly 22 in this switching position. In the friction bearing assembly 80, 82, there is no difference in revolution speed between neighboring parts.

In the other switching position of the sliding collar 66, in which the switching tooth systems 76 and 78 engage with each other, the planetary gear 8 is practically load-free. The roller bearing assembly 22 is subject to a high degree of friction, whereas the friction bearing assembly 80, 82 enables load-free gliding.

FIG. 3 shows a different embodiment of the sun wheel 52. A running tooth system 64 of the sun wheel here exhibits a sleeve 48, which is mounted in a torque-proof manner, whereby an internal tooth system 34 of said sleeve 48 engages with the running tooth system 64. The sleeve 48 then exhibits the switching tooth system 70 as an external tooth system, for connection with the switching tooth system 68 of the sliding collar 66. A friction bearing assembly 88 of the planet wheel 20 on the planet wheel axle 18 requires a supply of oil to this bearing assembly. To this end, boreholes 90, 92, which open into a space 94 covered with a cap 96, are provided in the planet wheel axle 18. This space 94 is connected, by means of a line 98, with the oil supply used elsewhere in the manual transmission 2. The planet wheel axle 18 is mounted in the planet gear carrier 10 with the roller bearing assembly 22, which, in this embodiment, consists of two individual cylinder roller bearings.

The arrangement according to the invention forms a claw-shaped switching device for a planetary gear which is arranged on the principal shaft of the gear. The switching of the rapid transmission ratio of the speed range gear, in direct connection, is practically load-free. Because the annulus is connected directly to the gearbox, there is no need for a support plate with a switching tooth system. Forces conducted by means of the output shaft can be borne in the annulus which is fastened to the gearbox, whereby an additional bearing assembly for the planet gear carrier can also be omitted.

Basically, the switching device according to the invention is suitable both for manual transmissions with one secondary shaft and for manual transmissions with a power split onto a plurality of secondary shafts.

REFERENCE NUMERALS

2 Manual transmission
4 Gearbox
6 Principal gear
8 Planetary gear
10 Planet gear carrier
12 Output shaft
14 Output flange
16 Bearing assembly 18 Planet wheel axle
20 Planet wheel
22 Roller bearing assembly
24 Annulus
26 Tooth system
28 Tooth system
30 Secondary shaft
32 Bearing assembly
34 Internal tooth system
36 Extension
38 Roller bearing
40 Secondary shaft
42 Bearing assembly
44 Principal shaft
45 Pivot
46 Gear wheel
48 Sleeve
50 Sleeve
52 Sun wheel
54 Sleeve
56 Pressure pad
58 Pressure pad
60 Pressure pad
62 Pressure pad
64 Running tooth system
66 Sliding collar
68 Switching tooth system
70 Switching tooth system
72 Internal tooth system
74 External tooth system
76 Switching tooth system
78 Switching tooth system
80 Friction bearing assembly
82 Friction bearing assembly
84 Rim
86 Ring
88 Friction bearing assembly
90 Borehole
92 Borehole
94 Space
96 Cap
98 Line

The invention claimed is:

1. A planetary gear (8) comprising;
an annulus (24);
a sun gear (52);
a planet gear carrier (10) with at least one planet wheel axle (18) on which at least one planet wheel (20) is mounted; and
a switching device with a sliding collar (66) which
in a first switching position enables a direct connection between a driving a shaft (44) which drives the planetary gear (8) and an output shaft (12) of the planetary gear (8); and
in a second switching position enables modification of a revolution speed between the driving shaft (44) and the output shaft (12) of the planetary gear (8);
wherein the at least one planet wheel (20) of the planetary gear is rotatably supported on a corresponding rotatable planet wheel axle (18) by an axle bearing assembly (22, 88) and the at least one planet wheel axle (18) of the planetary gear is rotatably supported in the planet gear carrier 10 by a carrier bearing assembly (20, 82); and
the planet wheel axle (18) is mounted in the planet gear carrier (10) by a friction bearing assembly, and the planet wheel (20) is mounted on the planet wheel axle (18) by a roller bearing assembly.

2. The planetary gear (8) according to claim 1, wherein the planet gear carrier (10) has a device (84, 86) which prevents axial displacement of the planet wheel axle (18) in the planet gear (10).

3. The planetary gear (8) according to claim 1, wherein the planet wheel axle (18) has oil supply devices (90, 92, 94, 98) which are connected to a gear oil supply.

4. The planetary gear (8) according to claim 1, wherein the switching device has a neutral position which lies between the first and the second switching positions and in which the output shaft (12) of the planetary gear (8) is not driven.

5. The planetary gear (8) according to claim 1, wherein both the annulus (24) and the sun gear (52) have pressure pads (56, 58, 60, 62) which rest against the planet wheel (20).

6. The planetary gear (8) according to claim 1, wherein one of the bearing assemblies (22) includes a multiple row bearing.

7. The planetary gear (8) according to claim 1, wherein the planetary gear (8) represents a speed range gear of a vehicle transmission (2), formed so as to be connected, by a torque-transferring drive train, to a principal gear (6) so that the driving shaft (44) of the principal gear (6) forms the drive shaft of the planetary gear (8).

8. The planetary gear (8) according to claim 1, wherein a principal gear (6) includes two secondary shafts (30, 40) and the driving shaft (44) is mounted in a floating manner between the two secondary shafts (30, 40), so that the driving shaft (44) serves as an output shaft of the principal gear (6) and forms a drive shaft of the planetary gear (8), and an end (45) of driving shaft (44) is mounted to the sun wheel (52) of the planetary gear (8).

9. A planetary gear (8) comprising;
an annulus (24);
a sun gear (52);
a planet gear carrier (10) with at least one planet wheel axle (18) on which at least one planet wheel (20) is mounted; and
a switching device with a sliding collar (66) which
in a first switching position enables a direct connection between a driving shaft (44) which drives the planetary (8) and an output shaft (12) of the planetary gear (8); and
in a second switching position enables modification of a revolution speed between the driving shaft (44) and the output shaft (12) of the planetary gear (8);
wherein the at least one planet wheel (20) of the planetary gear is rotatably supported on a corresponding rotatable planet wheel axle (18) by an axle bearing assembly (22, 88) and the at least one planet wheel axle (18) of the planetary gear is rotatably supported in the planet gear carrier (10) by a carrier gearing assembly (20, 82); and
the planet wheel axle (18) is mounted in the planet gear carrier (10) by a roller bearing assembly, and the planet wheel (20) is mounted on the planet wheel axle (18) by a motion bearing assembly.

10. The planetary gear (8) according to claim 9, wherein the planet gear carrier (10) has a device (84, 86) which prevents axial displacement of the planet wheel axle (18) in the planet gear carrier (10).

11. The planetary gear (8) according to claim 9, wherein the planet wheel axle (18) has oil supply devices (90, 92, 94, 98) which are connected to a gear oil supply.

12. The planetary gear (8) according to claim 9, wherein both the annulus (24) and the sun gear (52) have pressure pads (56, 58, 60, 62) which rest against the planet wheel (20).

* * * * *